(12) United States Patent
Watson et al.

(10) Patent No.: US 7,367,721 B2
(45) Date of Patent: May 6, 2008

(54) BI-STABLE MECHANICAL PHOTOGRAPHIC SHUTTER

(75) Inventors: Mark Watson, Williamson, NY (US); Stephen T. Pasquarella, Rochester, NY (US)

(73) Assignee: VA, Inc., Rochester, NY (US)

( * ) Notice: Subject to any disclaimer, the term of this patent is extended or adjusted under 35 U.S.C. 154(b) by 343 days.

(21) Appl. No.: 11/099,744

(22) Filed: Apr. 6, 2005

(65) Prior Publication Data

US 2006/0228109 A1    Oct. 12, 2006

(51) Int. Cl.
*G03B 9/08* (2006.01)
(52) U.S. Cl. .................................. 396/453; 396/467
(58) Field of Classification Search ................ 396/453, 396/454, 456, 467, 469
See application file for complete search history.

(56) References Cited

U.S. PATENT DOCUMENTS

| | | | | |
|---|---|---|---|---|
| 3,470,808 A | * | 10/1969 | Bloemendaal et al. | 396/467 |
| 3,595,553 A | | 7/1971 | Vincent | |
| 3,664,251 A | * | 5/1972 | Vincent | 396/454 |
| 6,652,165 B1 | | 11/2003 | Pasquarella | |

* cited by examiner

*Primary Examiner*—W. B. Perkey
*Assistant Examiner*—Rishi S. Suthar
(74) *Attorney, Agent, or Firm*—Stephen B. Salai; Brian B. Shaw; Harter Secrest & Emery LLP (57) ABSTRACT

An electromagnetically operable rotary shutter is rendered bi-stable by the use of two linear electric motors, one to open the shutter and a second to close the shutter together with a latch that holds the shutter in either an open or a closed position in the absence of power to purposefully open or close the shutter.

19 Claims, 8 Drawing Sheets

BI-STABLE MECHANICAL PHOTOGRAPHIC SHUTTER

TECHNICAL FIELD

The present invention relates generally to photonic or photographic shutters and more particularly to an electrically actuated mechanical shutter that is bi-stable in that it remains either open or closed in the absence of motor activation.

BACKGROUND OF THE INVENTION

Electrically operated lens shutters used in various types of photographic and laboratory equipment are well known in the art. Lens shutters especially adapted for use in scientific applications can open and close in a fraction of a second; frequencies of 2 to 400 cycles per second and higher are common.

Lens shutters generally are of two types. In one type, a so-called "guillotine" shutter has one or two thin, metal blades or leaves arranged to cover a lens opening. Pivot connections allow each blade to swing between a closed position where the blades cover the lens opening and an open position where the blades are drawn aside from the lens opening.

The present invention concerns a second type of shutter wherein a plurality of pivotally mounted blades, usually five, is arranged around the lens. Each blade is connected to a rotatable ring. In the operation of these rotary shutters, the rotation of the ring in one direction causes the blades to swing in unison to an open position. Counter rotation of the ring swings the blades to a closed position over the lens opening after exposure. Generally, a linear electric motor is used to activate the shutter. When activated, the linear motor pulls on a lever arm that rotates the ring to open the shutter. To close the shutter, the motor is deactivated and a spring causes the counter rotation of the ring to close the shutter. As noted above, shutters of this sort can cycle open and close several hundred times per second.

It is common in both types of shutters to provide a shock absorber or damper that absorbs the impact as the blades are pivoted between the open and closed positions. In this respect, reference is made to various US patents including U.S. Pat. Nos. 3,595,553; 3,664,251; and 6,652,165, the disclosures of which are incorporated herein by reference. As disclosed in these references, the shock absorber operates to stop the shutter blade very rapidly, yet softly and without damage. There also is little or no bounce as the shutter first is snapped open by the linear electric motor and then is snapped closed by the spring when the motor is deenergized.

In some applications, however, it is desirable to hold the shutter open for an extended period to prolong the exposure time. In these cases, it has been the practice to keep the motor activated for the duration of the exposure in order to hold the shutter open against the bias of the spring urging the shutter to a closed position.

Maintaining power to the coil of a linear electric motor for an extended period has its drawbacks due mainly to the resulting generation of heat. If not dissipated, the heat could adversely affect the alignment of the optics, cause image distortion and shorten the life of the motor and other heat sensitive components of the shutter system. A fan, heat sink or heat dissipating fins that normally can solve a heat-generating problem are not appropriate in many applications. For example, fans are of little use if the shutter is located in a vacuum environment. In military and space exploration applications, weight can be an issue so the use of any additional component such as a heat sink or heat radiating fins is not appropriate.

In some applications, space also is a limitation. Space limitations particularly in the region of the shutter opening dictate the parameters of size and placement of apparatus for holding the shutter open. For example, components placed near the shutter opening must have a relatively low profile so as not to interfere with the cone angle of the light passing through the open shutter.

Accordingly, it is an object of the present invention to provide an improved photographic shutter and, in particular, a high-speed rotary shutter having long exposure capabilities.

Another object of the present invention is to provide a rotary photographic shutter that allows long exposures without generation of excessive heat.

Yet another object is to provide a rotary shutter that does not automatically close once power to the motor operating the shutter is cut off.

A further object is to provide a rotary photographic shutter that is bi-stable in that it remains latched in either an open or a closed position until power is applied to a motor to specifically open or close the shutter.

SUMMARY OF THE INVENTION

In the present invention, a rotary shutter is provided that is bi-stable in that once open, it remains open until positive action is taken to close it and once closed, it remains closed until action is taken to open it. This is accomplished by providing a pair of drive systems, one dedicated to opening the shutter and another to closing it. Each drive system is connected to a driver plate that rotates in one direction to open the shutter and then rotates in an opposite direction to close the shutter. Each system includes a linear electric motor that is active for only a fraction of a second to power the opening or closing operations and then is deactivated. In addition, a latch that is common to both systems maintains the shutter in either of the open or closed positions.

Accordingly, the present invention can be characterized by a photographic shutter having a driver plate connected to a plurality of shutter blades arranged to open and close a shutter opening responsive respectively to a to-and-fro rotation of the driver plate. The shutter is operated by a drive system including a pair of motors that are each activated to rotate the driver plate in one of the to-and-fro directions and a bi-stable latch that operates to hold the driver plate at one of the to-and-fro positions in the absence of the activation of either motor.

DETAILED DESCRIPTION OF THE INVENTION

Figure 1:
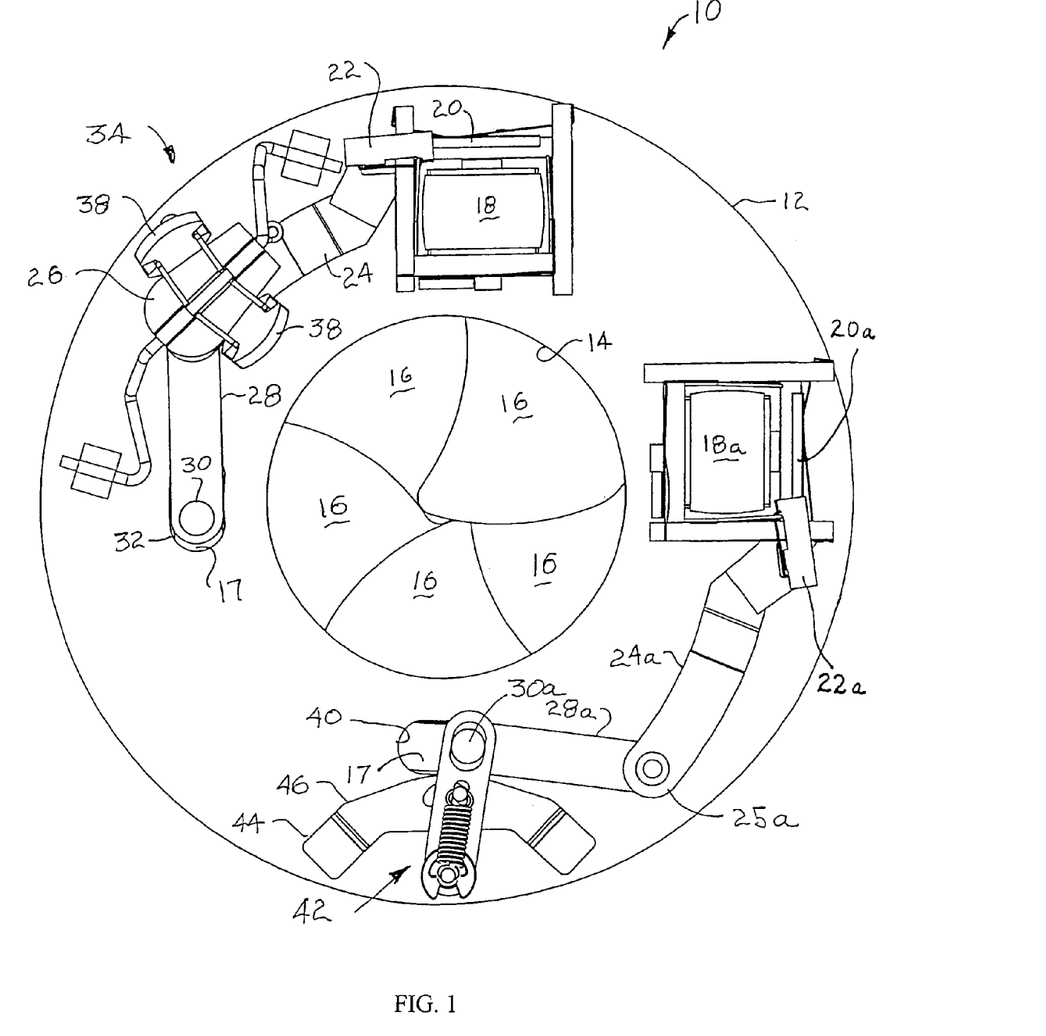
FIG. 1 is a plan view of a bi-stable mechanical photographic shutter of the present invention.

Referring to the drawings, FIG. 1 shows a rotary shutter of the present invention generally indicated at 10. It should be appreciated that various components, brackets and wiring harnesses of the shutter assembly have been omitted for clarity. For purposes of orientation, the shutter includes a base plate 12 having a central aperture 14. Supported at the underside (not shown) of the base plate are a plurality of shutter blades 16, portions of which are seen through the aperture.

The rotary shutter is conventional. It is sufficient for purposes of the present invention to say that the shutter blades are operatively attached to a driver plate on the underside of the base plate that rotates with respect to the base plate. Rotation of the driver plate relative to the base plate in one direction moves the shutter blades aside and opens the aperture. Reciprocal rotation of the driver plate moves the shutter blades back to the position shown in FIG. 1 wherein the aperture is closed. Thus, the driver plate rotates in a to-and-fro motion to respectively open and close the shutter.

In a conventional operation, the driver plate is operated by a single linear electric motor. The motor usually is arranged so that when it is energized, it pulls a drive arm to open the shutter. Then, when the motor is deenergized, a spring returns the driver plate to a home or closed position.

For example and with reference to FIG. 1, the means for operating the driver plate includes an electromagnetic actuator or linear electric motor 18 mounted to the base plate. The motor 18 includes an armature 20 that is connected to the driver plate by a linkage assembly including a rocker arm 22 extending laterally from the armature and a drive arm 24 engaged by the rocker arm. The drive arm is flat and formed of very thin sheet metal to minimize mass and is pivotally supported so its end (disposed below a plate 26) remote from the rocker arm moves in an arcuate path of travel. This remote end of the drive arm in turn is connected to a link 28. The link has a connector 30 that extends through an elongated opening 32 in the base plate for connection to the driver plate 17, a portion of which is seen through the opening 32.

The swinging movement of the drive arm 24 is damped by a damping system generally indicated at 34. The damping system is conventional and is more particularly described in U.S. Pat. No. 6,652,165, the disclosure of which is incorporated herein by reference. It is sufficient for purposes of the present invention merely to say that the damping system includes dampers (not shown) on the drive arm 24 that engages against one or another of two bumpers 38 mounted at the end of spring wires carried by the plate 26. The engagement of a damper against one or another of the bumpers arrests the motion of the drive arm with a minimum of shock and bounce so there is a smooth, shock-free opening of the shutter when the motor is energized and a smooth shock-free closing of the shutter as it is returned to a closed position. In a conventional system, the return of the shutter to a closed position is by spring action.

In contrast with a conventional system, there is no spring for returning the shutter to a closed position once the electromagnetic actuator 18 is deenergized. Instead, the present invention employs a second electromagnetic actuator or linear electric motor 18a mounted to the base plate to move the drive plate. The actuator 18a is a duplicate of the actuator 18 and includes an armature 20a that engages a laterally extending rocker arm 22a. The rocker arm engages a drive arm 24a that is pivotally supported so its end 25a remote from the rocker arm moves in an arcuate path of travel. At its end 25a, the drive arm 24a is connected to a link 28a. The link has a connector 30a that extends through an elongated opening 40 in the base plate for connection to the driver plate 17, a portion of which is seen through the opening 40.

As noted above, motors 18, 18a preferably are linear electric motors wherein energizing the motor causes either a push or a pull motion. For purposes of the present invention, it is preferred that the motors operate by pulling on respective drive arms 24, 24a and links 28, 28a to move the driver plate 17 in one of a to-and-fro direction. For example, if energizing motor 18 pulls the driver plate 17 in one direction to open the shutter, the energizing of the motor 18a will pull the driver plate 17 in the opposite direction to close the shutter. It should be appreciated that to accomplish the opening and closing of the shutter, one of the motors 18, 18a must be deenergized before the other is energized. It also should be appreciated that while linear electromagnetic motors are preferred, any suitable motor can be used to move the driver plate in the to-and-fro direction.

In accordance with the present invention, motors 18, 18a are deenergized immediately after operating to move the driver plate to one or the other of the shutter set positions (either open or closed). This allows the shutter to remain at a set position (either open or closed) until the other motor is energized. With both motors deenergized, such as during a long exposure time, it is important to provide a latch to hold the shutter in its set position. Otherwise, an exterior vibration or other event could cause the shutter to prematurely move from its set position. Accordingly, the present invention includes a bi-stable latch generally indicated at 42.

Figure 2:
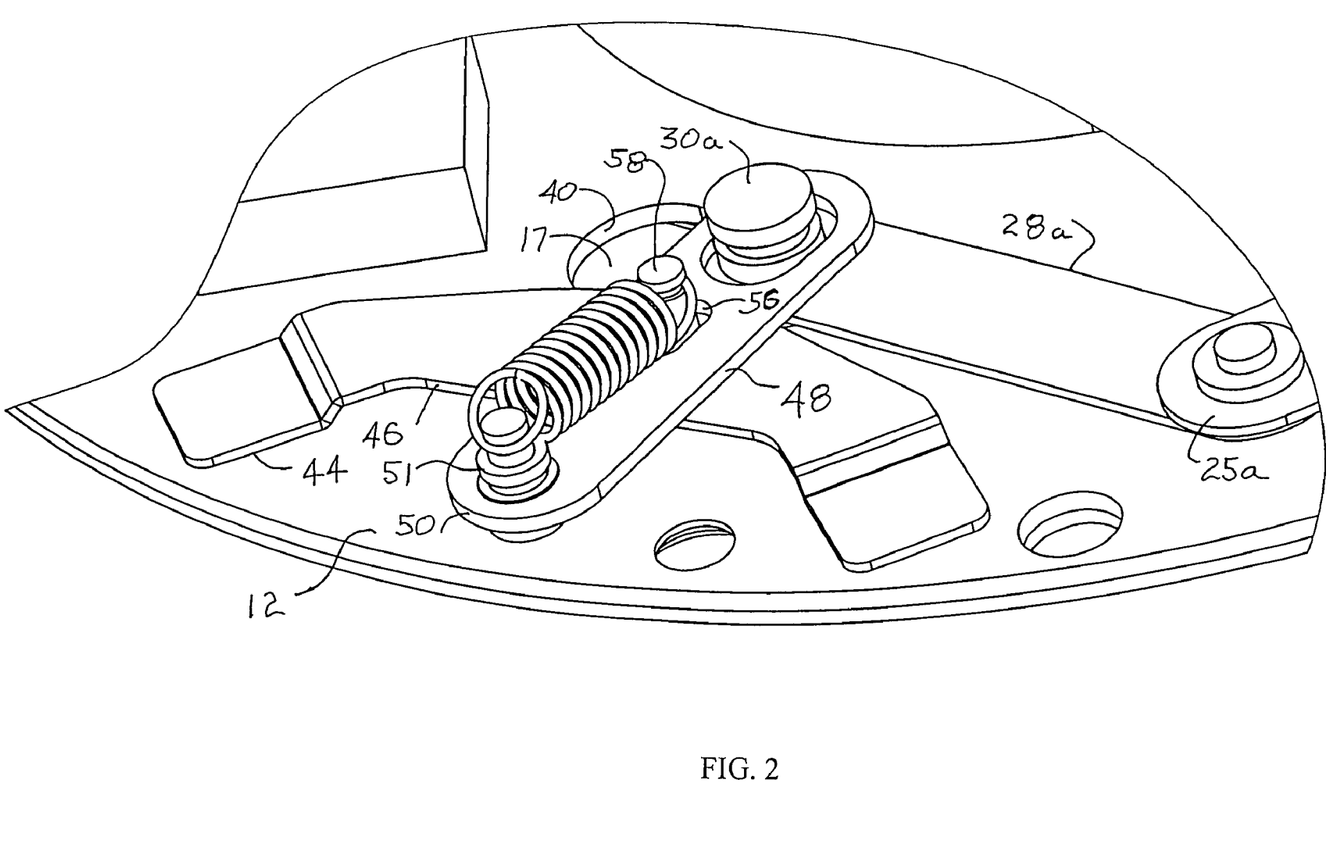
FIG. 2 is a perspective view of a portion of the shutter of FIG. 1 on an enlarged scale showing the bi-stable latch.
Figure 3:
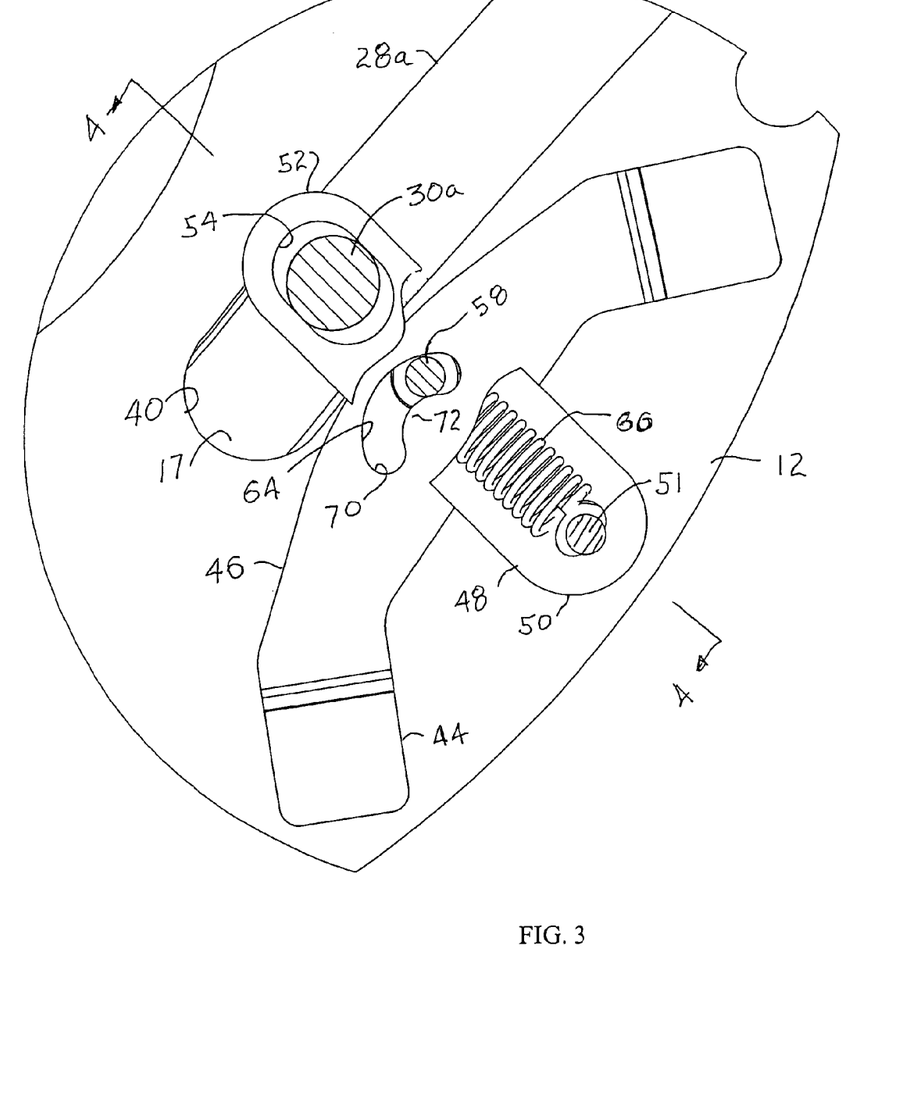
FIG. 3 is a plan view of FIG. 2 with portions broken away and in section.

The latch 42 as seen in FIGS. 1 and 2 includes a bridge 44 attached to the base plate 12. The bridge has a center span 46 that is raised above the surface of the base plate. As best seen in FIG. 3, center span 46 is provided with an arcuate cam slot 64. A pivot arm 48 disposed over the center span 46 of the bridge has one end 50 pivotally connected by a pivot pin 51 to the base plate 12. The opposite end portion 52 of the pivot arm has an elongated slot 54. This slot is just wide enough to accommodate the connector 30a in that the connector can slide along the slot, but there is little or no side-to-side movement of the connector in the slot. As noted above, the connector 30a extends through an opening 40 in the base plate to pivotally connect the link 28a to the shutter driver plate 17 on the underside of the base plate.

The pivot arm 48 has a second elongated slot 56 (FIG. 2) in a portion of the pivot arm above the bridge center span 46. This second slot is disposed transverse the cam slot 64 and registers with the cam slot 64 to accommodate passage of an upstanding latch pin 58. The diameter of the latch pin is close to the width of the slot 56 for purposes set out hereinbelow.

Figure 4:
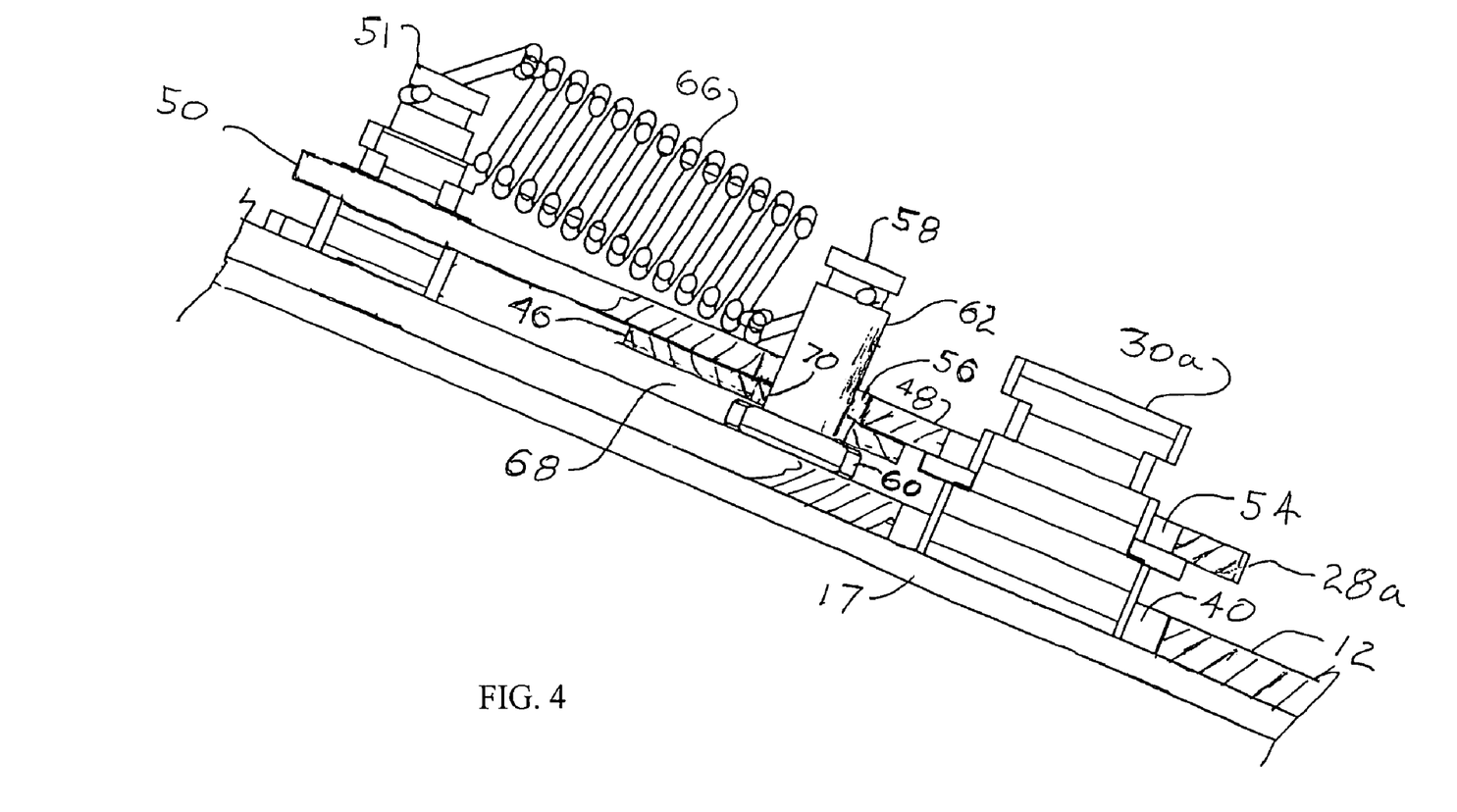
FIG. 4 is a view taken along lines 4-4 of FIG. 3 with portions partly broken away and in section and other components not shown.

As best seen in FIG. 4, the latch pin 58 is a floating pin in that it has a base 60 that slides on the surface of the base plate 12. The latch pin further has an upstanding portion 62 that extends up from the base and through both cam slot 64 in the bridge center span 46 and the elongated slot 56 in the pivot arm 48 (see FIGS. 3 and 4). The upper end of the latch pin 58 is connected to a spring 66 that extends between the latch pin and the pivot pin 51. It should be appreciated that the height of the bridge center span 46 above the base plate 12 is substantially equal to the height of the latch pin base 60. With this arrangement, the base plate 12 and the bridge center span define a channel 68 therebetween that slidably restrains the latch pin base and prevents the latch pin from tipping responsive to the bias of the spring 66 connected to the top of the latch pin.

The cam slot 64 in the bridge span 46 is best seen in FIG. 3. The cam slot is generally arcuate and has a cam surface 70 along one edge provided with a rounded center divider 72; the cam surface to either side of the divider defining stop positions. The bias of the spring 66 keeps the latch pin 58 pressed against the cam surface 70 so the latch pin can track along the cam surface to either side of the divider 72 to one or the other of the stop positions. As the latch pin moves along the cam surface 70, it slides relative to the pivot arm 48 and along the slot 56. As noted above, the diameter of the latch pin 58 is close to the width of the slot 56. This prevents any side-to-side motion of the pin relative to the pivot arm as the pin traverses the slot.

The description of the operation of the bi-stable shutter of the present invention will begin with the shutter closed and with both motors 18, 18a deenergized. With the shutter closed, the driver plate 17 is at the limit of its fro or counterclockwise position as shown in the Figures. In this position, the latch pin 58 is drawn by the spring 66 against the cam surface 70 into a stop position to the right of the divider 72 (FIG. 3). The pivot arm is held fixed by the latch pin and this in turn fixes the position of the link 28a, connector 30a and the driver plate 17 so the shutter is fixed in the closed position while both the motors 18, 18a are deenergized.

To open the shutter, the motor 18 is energized for a short duration (measured in milliseconds). This operates the drive arm 24 and link 28 to rotate the driver plate 17 (by pulling on pin 30) to a shutter open position. The rotation of the driver plate acting through the pin 30a causes the pivot arm 48 to pivot about the pivot pin 51 in a counterclockwise direction as viewed in the Figures. This forces the latch pin 58 to track along the cam surface 70. The force exerted to rotate the driver plate 17 to open the shutter is sufficient to overcome the bias of the spring 66 so the latch pin can track along the cam surface and travel up and over the rounded divider 72 to a stop position at the left side of the cam slot (the base 60 of the latch pin sliding along the surface of the base plate 12 allowing the latch pin to move relative to the bridge center span 46).

At the end of the shutter opening operation, the motor 18 is deenergized. With motor 18 deenergized, the spring 66 maintains its pull on the latch pin and keeps the latch pin anchored in the stop position at the left side of the divider 72. In this position, the latch pin 58 prevents the pivot arm from moving, which fixes the connector 30a so movement of the link 28a is prevented. In this fashion, the driver plate 17 (and shutter) is locked in the shutter open position.

With the components of the latch in this position, the shutter can remain open for an extended period without the danger of an inadvertent closing and without the need to maintain the motor 18 energized for the duration of the time the shutter is held open.

To close the shutter, the motor 18a is energized for only a fraction of a second. This causes the drive arm 24a to pivot and pull the link 28a to the right as shown in the Figures. The link 28a, acting through the connector 30a, pulls on the driver plate to rotate the driver plate clockwise back to the shutter closed position. Since the connector 30a engages the sides of the slot 54, the pivot arm 48 is caused to pivot in a clockwise direction about its pivot pin 51.

As noted hereinabove, the latch pin is captured in the pivot arm slot 56. Accordingly, the clockwise movement of the pivot arm together with the bias exerted on the latch pin by spring 66 forces the latch pin 58 to track back along the cam surface 70 and up over the divider. The pulling force of the motor 18a is sufficient to overcome the bias of the spring 66 so the latch pin travels up and over the rounded divider 72 back to the stop position at the right side of the cam slot. Once over the divider, the bias of the spring 66 holds the latch pin in the stop position, which in turn again locks the shutter in the shutter closed position even after the motor 18a is deenergized. The shutter will remain locked in its closed position until the motor 18 is again energized to open the shutter.

Accordingly, it should be appreciated that the present invention accomplishes its intended objects by providing an improved photographic shutter and in particular, high-speed rotary shutter having long exposure capabilities wherein a long exposure time does not require that a shutter opening electric motor be energized for the entire time that the shutter remains open. Since an electric motor is not energized for the duration of a long exposure time, there is little or no heat generated. This means that in heat sensitive applications, there is no need to provide for a heat dissipating structure or system.

The present invention further provides a bi-stable device that does not change state from an open or a closed position once an activating motor is deenergized. For example, the shutter does not automatically close once power to a shutter operating linear motor is cut off. Conversely, the shutter does not automatically open once power to a shutter closing motor is cut off so that the rotary photographic shutter of the present invention is bi-stable in that it remains latched in either an open or a closed position until power is applied to a motor to specifically open or close the shutter.

Figure 5:
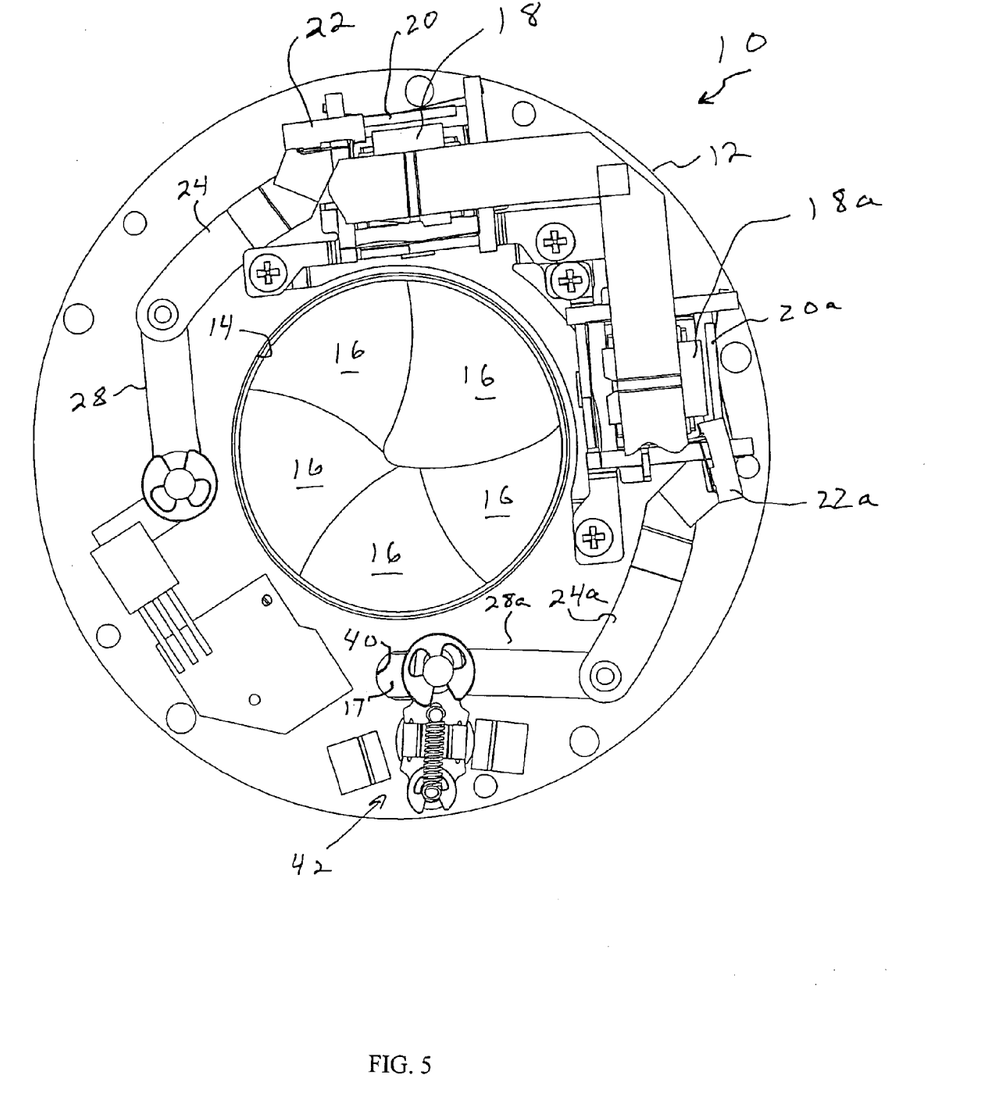
FIG. 5 is a plan view of another embodiment of a bi-stable mechanical photographic shutter in accordance with this invention having a damper formed integrally with the bi-stable latch.

FIG. 5 shows an alternative embodiment of this invention in which a rotary shutter indicated generally at 10 is provided with a bi-stable latch having an integral damper. This embodiment of the invention shares a number of elements with the embodiments shown in FIGS. 1 through 4 which are accordingly designated by the same reference numerals. As is the case in FIG. 1, various components, brackets and wiring harnesses have been omitted for clarity. The shutter includes a base plate 12 having a central aperture 14. Supported at the underside (not shown) of the base plate are a plurality of shutter blades 16, portions of which are seen through the aperture 14. The details of the rotary shutter are substantially as described above in connection with FIGS. 1 through 4.

Electromagnetic actuators for linear electric motors 18 and 18a function in essentially the same manner as the like numbered components of the shutter shown in FIG. 1. The damping system 34 is omitted from this embodiment of the invention and replaced with a damper formed integrally with the bi-stable latch 42 as will be described in more detail below.

Figure 6:
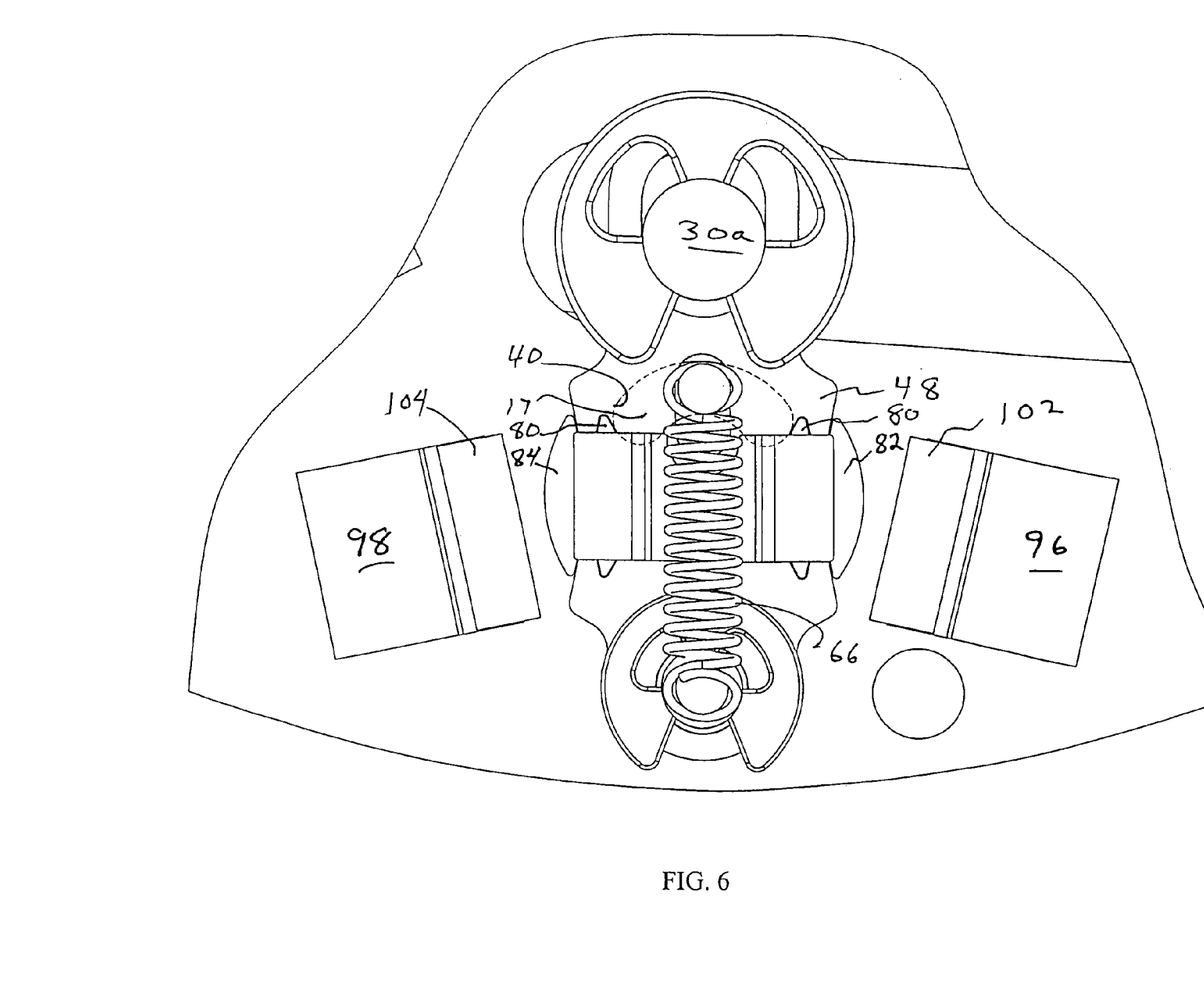
FIG. 6 is an enlarged fragment of the bi-stable mechanical photographic shutter of FIG. 5 showing the integral bi-stable latch and damper in more detail.

FIG. 6 is an enlarged fragmentary view of the bi-stable latch with integral damper in accordance with the invention. The latch indicated generally at 42 functions in substantially the same way as latch 42 shown and described in connection with FIGS. 1 through 4. As can be seen in more detail in FIGS. 6 through 8, the pivot arm 48 has laterally opposed slots 80 formed in the sides thereof for receiving cooperatively shaped left and right bumpers 82, 84. As can be seen most clearly in FIG. 8, the bumpers 82, 84 are generally oval in shape with notches 86 formed in the long ends thereof for being received in the slots 80 in the pivot arm.

Figure 8:
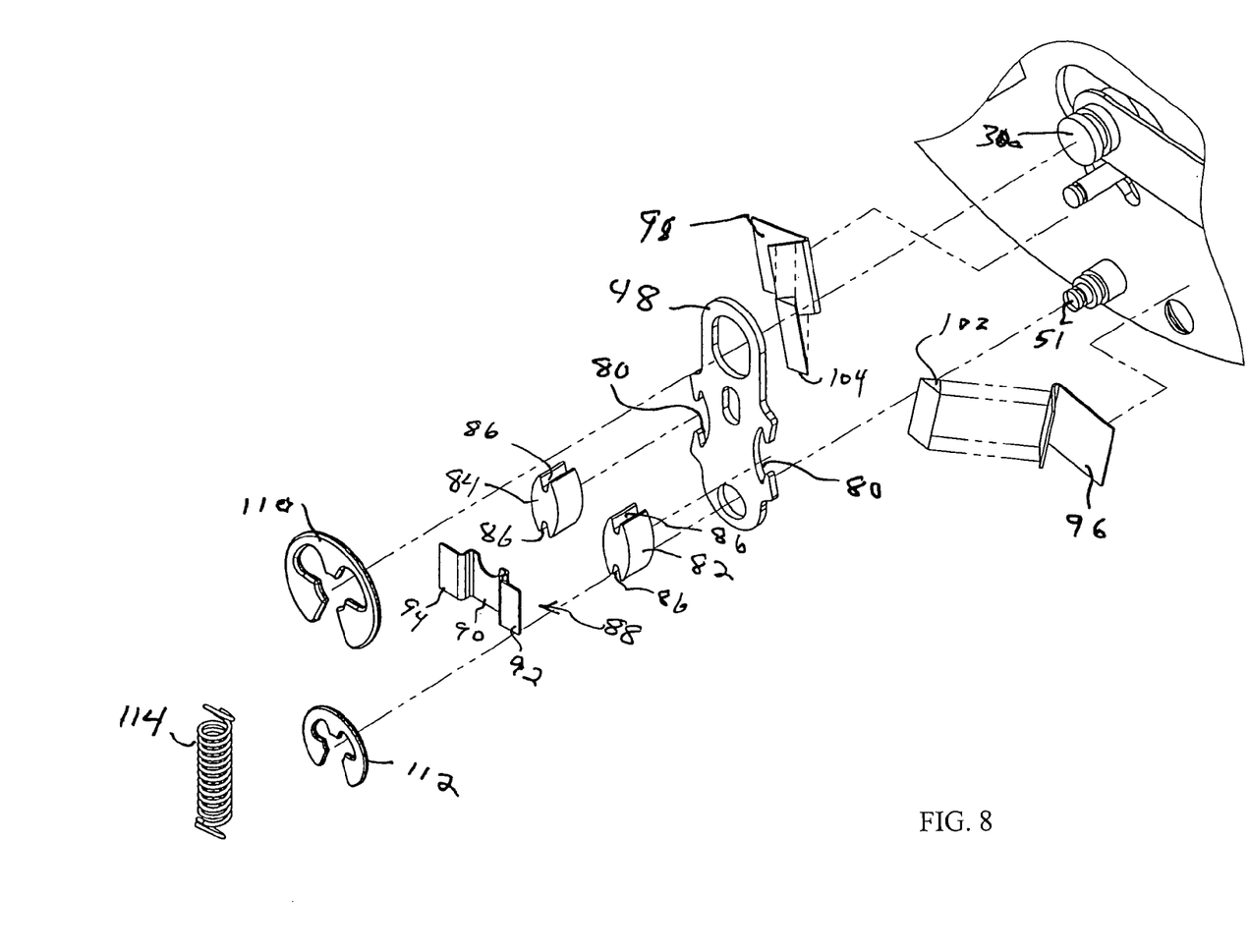
FIG. 8 is an exploded view of the bi-stable latch with integral dampers in accordance with the invention.

A bracket having a notched central portion 90 and two wings 92, 94 holds the bumpers in place.

Figure 7:
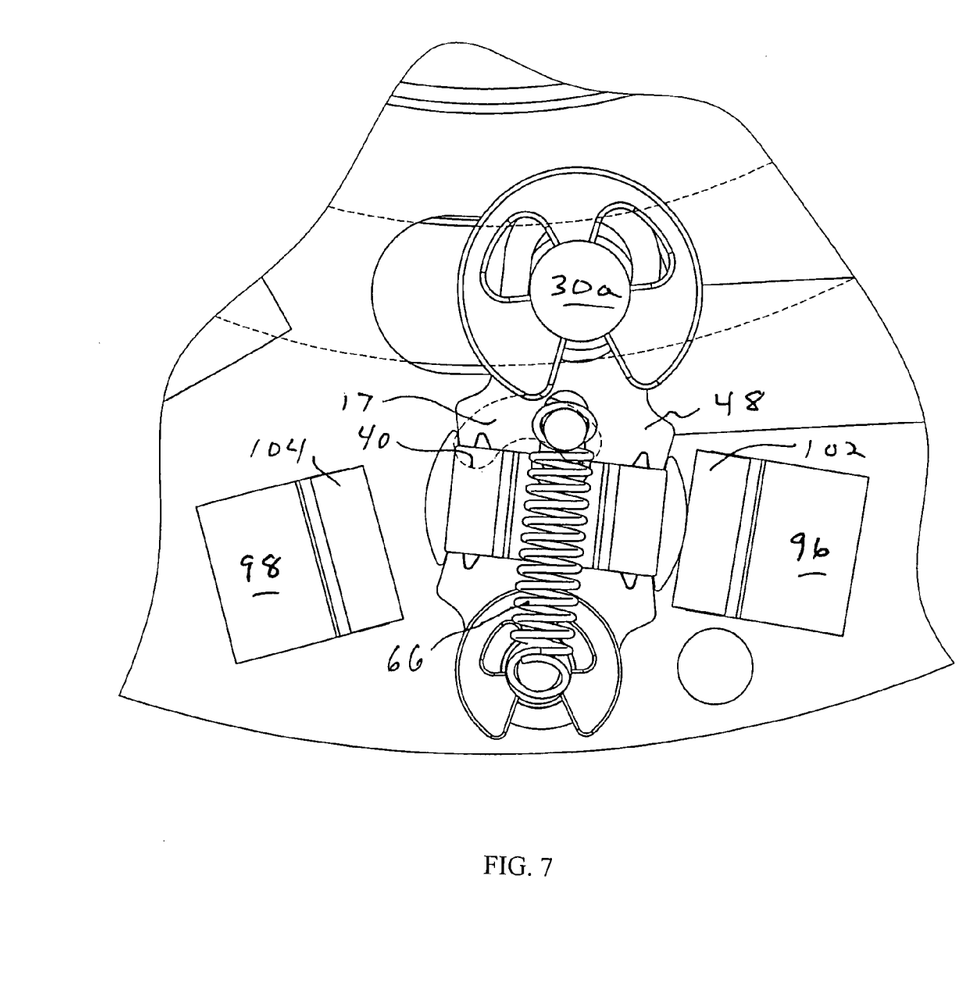
FIG. 7 is an enlarged fragment of the bi-stable latch of FIG. 5 showing the integral latch and damper in one of two stable positions.

As the bi-stable latch moves from one stable position to the other, the bumpers 82, 84 engage fixed side plates 96, 98 spaced apart from the pivot arm. Each side plate has a damper element 102, 104 attached thereto for engaging the respective bumpers as the latch moves between the left and right stable positions. FIG. 7 shows the latch in the right stable position with the damper engaging the bumper element. It will be appreciated that the dampers and bumpers are sized and arranged so that they limit the movement of the bi-stable latch.

Preferably, the latch is assembled with c rings 110, 112 that fit in slots on posts 30a, 51 extending from the base plate through the latch elements. A spring 114 corresponding essentially to spring 66 biases the latch to one of the two stable positions.

By combining the damper with the bi-stable latch, a considerable simplification of the structure of the bi-stable shutter is achieved.

Having described the invention in detail, what is claimed as new is:

1. A bi-stable photographic shutter comprising:
   a) a driver plate connected to a plurality of shutter blades arranged to open and close a shutter opening responsive respectively to the rotation of the driver plate to one of a to and a fro position;
   b) a pair of motors each activated to rotate the driver plate to one of the to-and-fro positions;
   c) a linkage associated with each motor and operatively connecting each motor to the driver plate, a motor and its associated linkage operating to move the driver plate to only one of the to-and-fro positions;
   d) a fixed member having a cam slot defining spaced stop positions along a cam surface;
   e) a pivot arm connected to one of the linkages, the pivot arm having an elongated slot;
   f) the fixed member and pivot arm being disposed one above the other with the pivot arm slot extending transverse the fixed member cam slot;
   g) a latch pin extending through both slots, the latch pin being biased towards the cam surface and movable along the cam surface to one or the other of the stop positions; and
   h) the fixed member, pivot arm and latch pin comprising a latch holding the driver plate at one of the to-and-fro positions in the absence of the activation of either motor.

2. A bi-stable photographic shutter as in claim 1 wherein each motor is a linear electric motor.

3. A bi-stable photographic shutter as in claim 1 wherein each motor is a component of a drive system dedicated to one of the opening and closing of the shutter.

4. A bi-stable photographic shutter as in claim 1 wherein the fixed member is disposed above the pivot arm.

5. A bi-stable photographic shutter as in claim 1 wherein the fixed member is a bridge having a span disposed above a base plate, the span and base plate defining a channel therebetween and the latch pin having a base portion slidably captured in the channel.

6. A bi-stable photographic shutter as in claim 1 wherein the cam slot has a divider along the cam surface separating the spaced stop positions one from the other.

7. A bi-stable photographic shutter as in claim 6 wherein the cam slot is arcuate and the divider is a rounded portion and the latch pin rides up and over the rounded portion in moving from one stop position to another.

8. A bi-stable photographic shutter as in claim 1 wherein each linkage includes a drive arm and a damper is associated with at least one of the drive arms to arrest the motion of both linkages.

9. A bi-stable photographic shutter as in claim 8 wherein a damper is associated with each of the drive arms.

10. A bi-stable photographic shutter as in claim 1 wherein the latch includes an integral damper.

11. The bi-stable photographic shutter of claim 10 in which the integral damper is arranged to damp the motion of the bi-stable photographic shutter at the two extremes, open and closed.

12. The bi-stable photographic shutter of claim 10 in which the pivot arm comprises a first damping member and in which the latch further comprises a second damping member located adjacent to the pivot arm for engaging the first damping member when the latch pin moves to one or the other of the stop positions.

13. The bi-stable photographic shutter of claim 10 in which the latch has a pair of laterally opposed slots and a damper element mounted in each slot.

14. The bi-stable photographic shutter of claim 13 comprising a bracket for retaining the damper elements cared by the latch in place.

15. A method of operating a photographic shutter to provide stability in either a shutter open or a shutter closed position comprising:
   a) connecting a driver plate to a plurality of shutter blades which are arranged to open and close responsive respectively to the rotation of the driver plate in either a to or a fro direction;
   b) activating a first motor to rotate the driver plate in a to or a fro direction to a first stop position and activating a second motor to rotate the driver plate in the other of the to-and-fro directions to a second stop position, each motor being operatively connected to the driver plate by a linkage and each combination of motor and associated linkage being dedicated to moving the driver plate in only one of the to-and-fro directions;
   c) fixing a member with a cam slot relative to the driver plate;
   d) locating a latch pin associated with one of the linkages within the cam slot;
   e) moving the latch pin in the cam slot to one or the other of the stop positions responsive to the activation of one or the other of the motors for latching the driver plate at one of the to-and-fro stop positions respectively in the absence of the activation of either motor.

16. A method as in claim 15 including damping the motion of the linkages.

17. An electromechanical shutter comprising:
   a) a shutter blade movable between an open and a closed position;
   b) an actuator coupled to the shutter blade, the actuator including a pair of motors each activated to rotate the driver plate to one of the to-and-fro positions and a linkage associated with each motor and operatively connecting each motor to the driver plate;

c) a bi-stable latch coupled to the shutter blade for retaining the shutter in one of the open and closed positions including
   i) a fixed member having a cam slot defining spaced stop positions along a cam surface,
   ii) a pivot arm connected to one of the linkages, the pivot arm having an elongated slot,
   iii) the fixed member and pivot arm being disposed one above the other with the pivot arm slot extending transverse the fixed member cam slot, and
   iv) a latch pin extending through both slots, the latch pin being biased towards the cam surface and movable along the cam surface to one or the other of the stop positions; and d) a damper associated with the bi-stable latch for damping the motion of the shutter as it moves to one of the open and closed positions.

18. The electromechanical shutter of claim 17 in which the damper comprises at least one bumper attached to the pivot arm.

19. The electromechanical shutter of claim 18 comprising a fixed damper element engaging the at least one bumper as the bi-stable latch reaches one of the open and closed positions.

* * * * *